(12) United States Patent
To

(10) Patent No.: US 11,579,915 B2
(45) Date of Patent: Feb. 14, 2023

(54) COMPUTING NODE IDENTIFIER-BASED REQUEST ALLOCATION

(71) Applicant: Affirmed Networks, Inc., Acton, MA (US)

(72) Inventor: Philip To, Lexington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 16/818,225

(22) Filed: Mar. 13, 2020

(65) Prior Publication Data

US 2020/0293358 A1    Sep. 17, 2020

Related U.S. Application Data

(60) Provisional application No. 62/818,302, filed on Mar. 14, 2019.

(51) Int. Cl.
*G06F 9/455*  (2018.01)
*H04L 41/12*  (2022.01)

(52) U.S. Cl.
CPC .......... *G06F 9/45558* (2013.01); *H04L 41/12* (2013.01); *G06F 2009/45595* (2013.01)

(58) Field of Classification Search
CPC ................. H04L 41/12; G06F 9/45558; G06F 2009/45595
See application file for complete search history.

(56) References Cited

U.S. PATENT DOCUMENTS

2016/0226966 A1\*  8/2016  Lin ................. H04L 47/781

OTHER PUBLICATIONS

Aguilar, et al., "A Hamming Distance and Fuzzy Logic-Based Algorithm for P2P Content Distribution in Enterprise Networks", In Journal of Peer-to-Peer Networking and Applications, Feb. 22, 2019, pp. 1323-1335.
"International Search Report and Written Opinion Issued in PCT Application No. PCT/US2020/022650", dated Jun. 16, 2020, 12 Pages.
Strang, et al., "Using Gray Codes as Location Identifiers", In Proceedings of Geographical Institute of the University of Heidelberg, Oct. 8, 2009, 8 Pages.

\* cited by examiner

*Primary Examiner* — Wissam Rashid
(74) *Attorney, Agent, or Firm* — Ray Quinney & Nebeker P.C; James Bullough

(57) ABSTRACT

Computing node identifiers can be used to encode information regarding the distance between requesting and available computing nodes. Computing node identifiers can be computed based on proximity values for respective computing nodes. Requests can be directed from one computing node to an available computing node based on information encoded by both the computing node identifiers of the requesting node and the receiving node. Using these computing node identifiers to direct request traffic among VMs can more efficiently leverages network resources.

20 Claims, 6 Drawing Sheets

| VM    | Distance | Below threshold? |
|-------|----------|------------------|
| VM 1  | 1        | Yes              |
| VM 2  | 1        | Yes              |
| VM 3  | 2        | Yes              |
| VM 4  | 4        | No               |
| VM 5  | 4        | No               |

COMPUTING NODE IDENTIFIER-BASED REQUEST ALLOCATION

CROSS REFERENCE TO RELATED APPLICATIONS

This application claims priority to U.S. Application No. 62/818,302, entitled "Computing Node Identifier-based Request Allocation," filed Mar. 14, 2019, the content of which is incorporated by reference in its entirety.

TECHNICAL FIELD

The invention generally relates to networked systems and allocating requests across the networked systems.

BACKGROUND

Computing functions can be performed by a collaboration of distinct smaller functions, which can be distributed in different locations. For example, virtual machines (VMs) often operate in complex networked systems. In these virtualized environments, VMs can be spread across different physical architectures such as servers or server blades in the same or different chassis hosting the VMs. VMs can act as virtual network functions ("VNFs") that perform the function of existing network components. When acting as VNFs, VMs across the network can request services from one another. For example, a number of VM's, each implementing some functions, collaborate with one another to perform a network function which traditionally is performed by custom hardware and software.

One other way of distributing computing functions is using micro-services, in which a computing functions are broken down into a number of smaller tasks (sometimes referred to as micro-services) distributed in different computing resources. In such examples, some of these microservices may need to pass data back and forth between one another to complete a computing task. A micro-service may run inside a VM or it may run on bare metal. Microservices can also be implemented to perform network functions.

In order for networks that implement VMs, microservices, or other similar architectures to function efficiently, sufficient bandwidth with sufficiently low latency should be made available when a VM or microservice requests services from another VM or microservice. Existing networks lack effective means to gauge which VMs or microservices in the network should be requested for optimal performance. Furthermore, existing networks do not take advantage of other parameters such as jitter rate and latency.

SUMMARY

In some embodiments, a method includes: receiving, by a first computing node having a first computing node identifier ("ID"), computing node IDs of a plurality of other computing nodes; calculating, by the first computing node, proximity values for the plurality of other computing nodes based on a comparison of the first computing node ID with computing node IDs associated with the plurality of other computing nodes; identifying, by the first computing node, at least one second computing node from the plurality of other computing nodes based on a calculated proximity value associated with the at least one second computing node; and sending a processing request from the first computing node to one of the at least one second computing node based on the identification.

In some embodiments, the identifying the at least one second computing node from the plurality of other computing nodes comprises comparing the calculated proximity values for the plurality of other computing nodes to a threshold.

In some embodiments, the identifying the at least one second computing node from the plurality of other computing nodes comprises identifying a predetermined number of the plurality of other computing nodes having the shortest calculated proximity values to the first computing node.

In some embodiments, the calculating, based on the comparison of the first computing node ID to the computing node IDs of the plurality of other computing nodes, the proximity values for the plurality of other computing nodes comprises decoding Hamming distances between the first computing node ID to the plurality of other computing nodes IDs.

In some embodiments, the calculating, based on the comparison of the first computing node ID to the computing node IDs of the plurality of other computing nodes, the proximity values for the plurality of other computing nodes comprises calculating proximities based on separate segments of each of the first computing node ID and the computing node IDs of the plurality of other computing nodes.

In some embodiments, method includes: receiving, at a first computing node identifier ("ID") manager, a first level computing node ID segment corresponding to a first plurality of computing nodes managed by the first computing node ID manager, wherein the first level computing node ID segment encodes a proximity between the first plurality of computing nodes and one or more second pluralities of computing nodes managed at least one second computing node ID manager; receiving, at the first computing node ID manager, proximity values for pairs of computing nodes of the first plurality of computing nodes; computing, by the first computing node ID manager, a second level computing node ID segments for each of the first plurality of computing nodes based on the received proximity values, wherein each second level computing node ID encodes a Hamming distance to other of the first plurality of computing nodes; assembling, by the first computing node ID manager, a two-level computing node ID segment for each of the first plurality of computing nodes by combining the first level computing node ID segment with the second level computing node ID segment associated with each of the first plurality of computing nodes; and assigning the two-level computing node ID segments to each of the first plurality of computing nodes.

In some embodiments, the method further includes appending, by the first computing node ID manager, an IP address of an associated computing node from the first plurality of computing nodes to each two-level computing node ID segment before the assigning the two-level computing node ID segments.

In some embodiments, the method further includes receiving, by a first computing node of the first plurality of computing nodes, a two-level computing node ID segment associated with the first computing node from the first computing node ID manager; receiving, by the first computing node, computing node IDs of a plurality of other computing nodes, wherein at least some of the computing node IDs of the plurality of other computing nodes comprise two-level computing node ID segments; calculating, by the first computing node, proximity values for the plurality of other computing nodes based on a comparison of the two-level computing node ID segment associated with the first computing node with computing node IDs associated with the plurality of other computing nodes; identifying, by the first computing node, at least one second computing node from the plurality of other computing nodes based on a calculated proximity value associated with the at least one second computing node; and sending a processing request from the first computing node to one of the at least one second computing node based on the identification.

In some embodiments, a system includes: a first computing node associated with a first computing node identifier ("ID"), the first computing node comprising: a processor, and a computer readable storage medium having instructions thereon configured to cause the processor of the first computing node ID manager to: receive computing node IDs of a plurality of other computing nodes; calculate proximity values for the plurality of other computing nodes based on a comparison of the first computing node ID with computing node IDs associated with the plurality of other computing nodes; identify at least one second computing node from the plurality of other computing nodes based on a calculated proximity value associated with the at least one second computing node; and send a processing request from the first computing node to one of the at least one second computing node based on the identification.

In some embodiments, the identifying the at least one second computing node from the plurality of other computing nodes comprises comparing the calculated proximity values for the plurality of other computing nodes to a threshold.

In some embodiments, the identifying the at least one second computing node from the plurality of other computing nodes comprises identifying a predetermined number of the plurality of other computing nodes having the shortest calculated proximity values to the first computing node.

In some embodiments, the calculating, based on the comparison of the first computing node ID to the computing node IDs of the plurality of other computing nodes, the proximity values for the plurality of other computing nodes comprises decoding Hamming distances between the first computing node ID to the plurality of other computing nodes IDs.

In some embodiments, the calculating, based on the comparison of the first computing node ID to the computing node IDs of the plurality of other computing nodes, the proximity values for the plurality of other computing nodes comprises calculating proximities based on separate segments of each of the first computing node ID and the computing node IDs of the plurality of other computing nodes.

In some embodiments, system includes: a first computing node identifier ("ID") manager having a processor and a computer readable storage medium having instructions thereon configured to cause the processor of the first computing node ID manager to: receive a first level computing node ID segment corresponding to a first plurality of computing nodes managed by the first computing node ID manager, wherein the first level computing node ID segment encodes a proximity between the first plurality of computing nodes and one or more second pluralities of computing nodes managed at least one second computing node ID manager; receive proximity values for pairs of computing nodes of the first plurality of computing nodes; compute a second level computing node ID segments for each of the first plurality of computing nodes based on the received proximity values, wherein each second level computing node ID encodes a Hamming distance to other of the first plurality of computing nodes; assemble a two-level computing node ID segment for each of the first plurality of computing nodes by combining the first level computing node ID segment with the second level computing node ID segment associated with each of the first plurality of computing nodes; and assign the two-level computing node ID segments to each of the first plurality of computing nodes.

In some embodiments, the processor is further caused to append an IP address of an associated computing node from the first plurality of computing nodes to each two-level computing node ID segment before the assigning the two-level computing node ID segments.

In some embodiments, the system further includes a first computing node of the first plurality of computing nodes configured to: receive a two-level computing node ID segment associated with the first computing node from the first computing node ID manager; receive computing node IDs of a plurality of other computing nodes, wherein at least some of the computing node IDs of the plurality of other computing nodes comprise two-level computing node ID segments; calculate proximity values for the plurality of other computing nodes based on a comparison of the two-level computing node ID segment associated with the first computing node with computing node IDs associated with the plurality of other computing nodes; identify at least one second computing node from the plurality of other computing nodes based on a calculated proximity value associated with the at least one second computing node; and send a processing request to one of the at least one second computing node based on the identification.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 5 is a chart containing exemplary search results for a processing request with distance thresholding, according to some embodiments of the present disclosure.

DETAILED DESCRIPTION

Aspects of the present disclosure relate to networked systems and allocating requests across the networked system. Further aspects relate to improving the efficiency and timeliness for such requests by implementing a system of VM IDs. These VM IDs encode information regarding the distance between requesting VMs and available VMs. Using these VM IDs to steer request traffic among VMs as described herein can more efficiently leverages network resources. Although the present disclosure discusses VMs, a person of ordinary skill in the art would understand based on the present disclosure that the same techniques can apply to microservices with respective microservice IDs, other cloud-native architectures, or other types of computing nodes.

Figure 1:
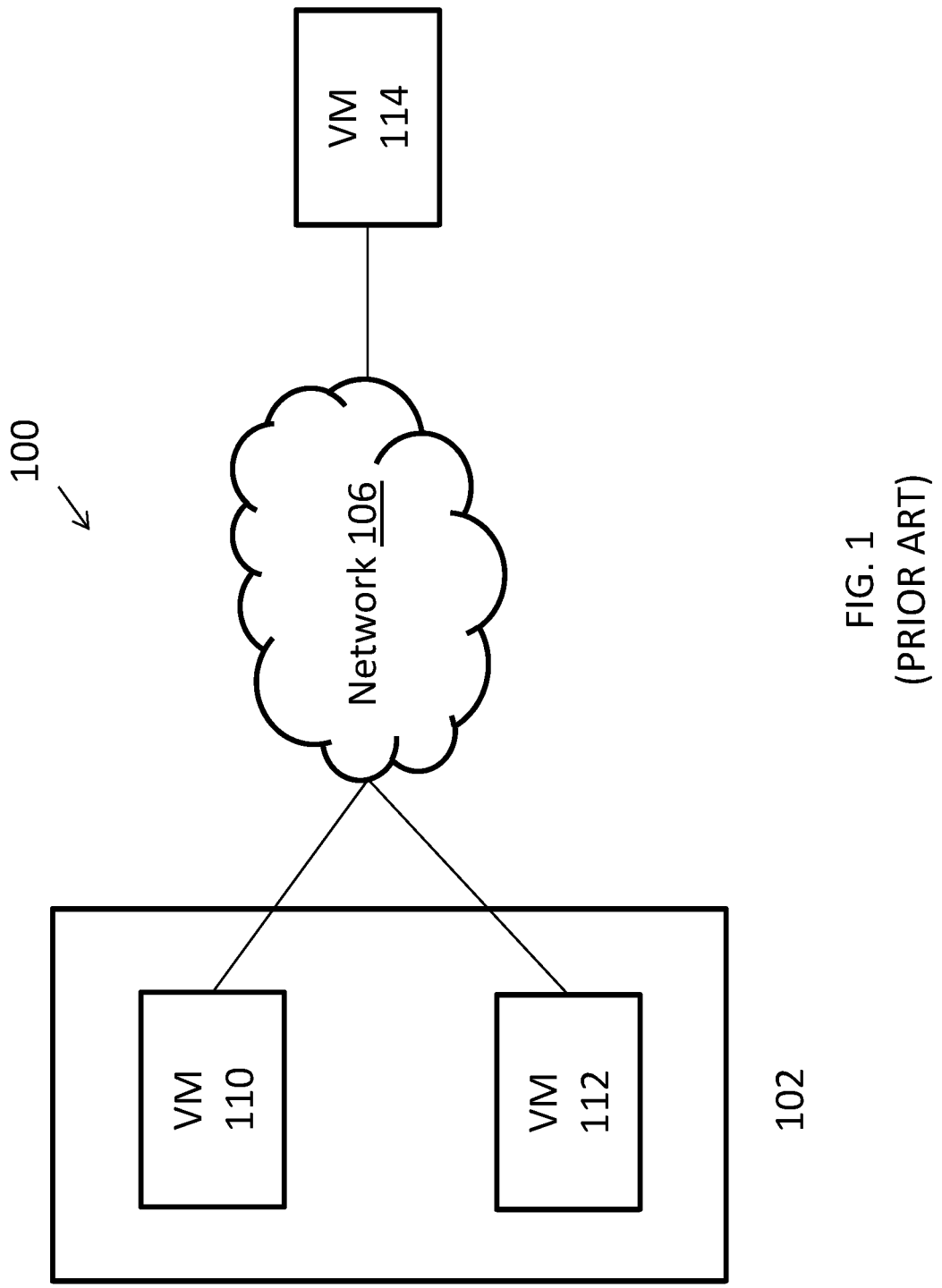
FIG. 1 is a system diagram of a prior art networked system.

FIG. 1 is a system diagram showing a prior art networked system 100. Networked system 100 may be, for example, a virtualized mobile network core residing in a cloud data center that can include functionalities such as session and mobility management, policy and charging control, Wifi interoperability, deep packet inspection, video/web optimization, etc. Networked system 100 contains VMs 110, 112, and 114, which are in communication with network 106. Virtual machines 110 and 112 may be grouped together into grouping 102 on a particular network level of VNF 100. For example, grouping 102 may consist of a chip, a server, a server blade, a data center, or any other type of physical or non-physical grouping or structure. In some embodiments, non-physical groupings may be based on latency or other tests that determine groupings of VMs that are suited for requests. Communications between VMs not within the same grouping structure generally have one or more of a lower bandwidth, higher jitter rate, and/or higher network latency. Although the present description of FIG. 1 discusses VMs, a person of ordinary skill in the art would understand based on the present disclosure that a similar system can be implemented with microservices (for example, with respective unique IP addresses registered to a service with a container orchestration framework) having respective microservice IDs, other cloud-native architectures, or other types of computing nodes.

Figure 2:
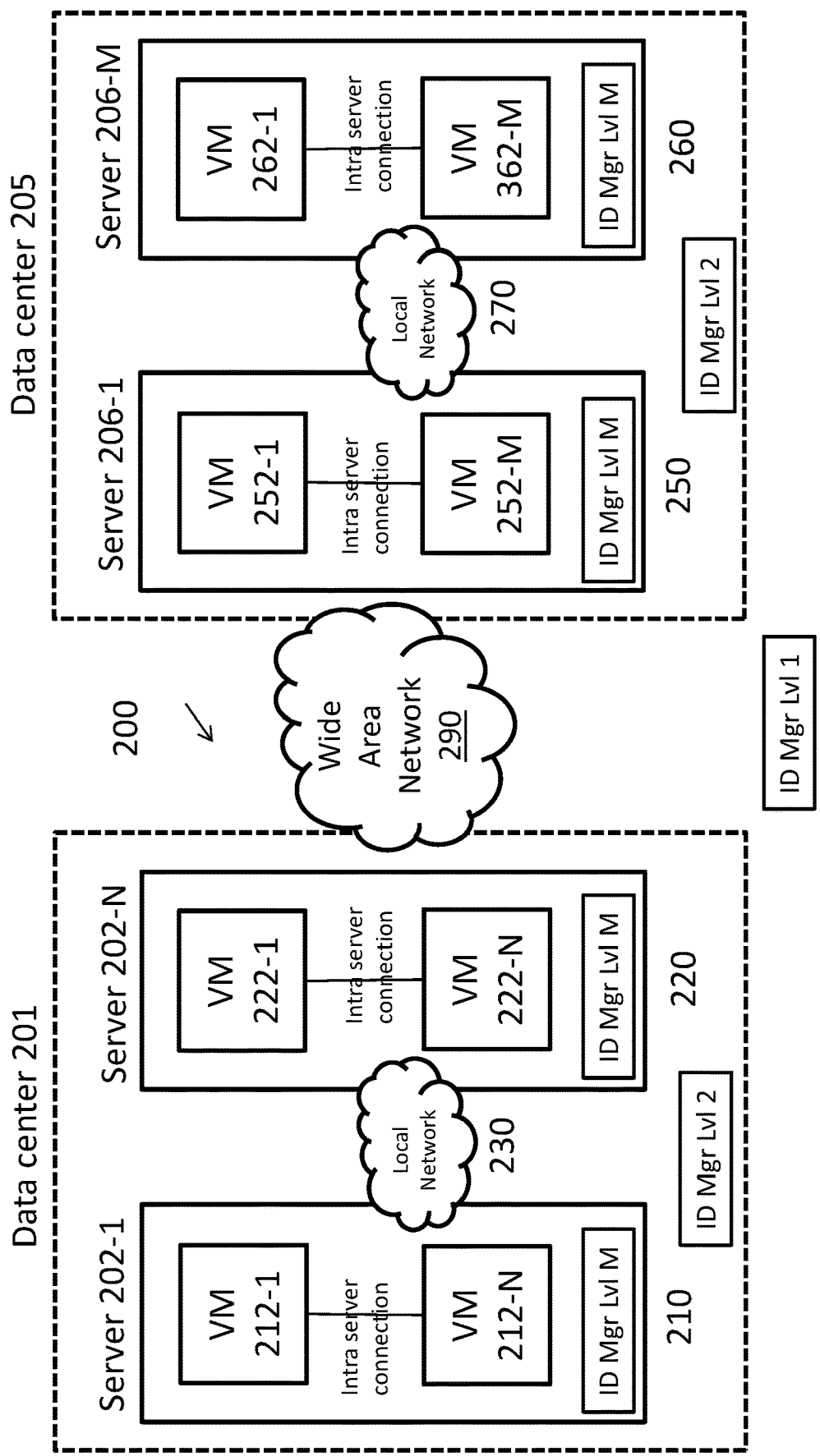
FIG. 2 is a block diagram of an exemplary networked system, according to some embodiments of the present disclosure.

FIG. 2 is a block diagram of a networked system 200, according to some embodiments of the present disclosure. Networked system 200 can contain data centers 201 and 205. In other embodiments, networked system 200 may comprise more or fewer data centers. Data centers 201 and 205 can communicate at the data center level over wide area network 290. Each of data centers 201 and 205 can contain one or more servers 202-1 to 202-N, and 206-1 to 206-M, respectively. Within data center 201 and data center 205, servers can communicate at the server level over local networks 230 and 270, respectively.

Each of servers 202 and 206 can contain one or more virtual machines 212, 222, 252, and 262. The number of virtual machines in one server can vary and need not be the same as in other servers. Virtual machines 212-1 through 212-N can communicate at the server level over one or more intra server connections.

In order to better steer traffic among VMs in networked system 200, each VM can be assigned a VM ID. In some embodiments, VM IDs can be assigned, at least in part, by ID managers at different network levels 1 to M of the networked system 200. For example, ID manager level 1 may correspond to the networked system level, ID manager level 2 may correspond to the data center level, and ID manager level M may correspond to the server level. In other embodiments, different or additional levels corresponding to physical and non-physical groupings may be implemented. ID managers can be, for example, software implemented locally at each level of the system, or can be a single software component or set of software components located elsewhere that take responsibility for particular levels (and/ or groupings) of VMs. Although the present description of FIG. 2 discusses VMs, a person of ordinary skill in the art would understand based on the present disclosure that a similar system can be implemented with microservices having respective microservice IDs, other cloud-native architectures, or other types of computing nodes.

Figure 3:
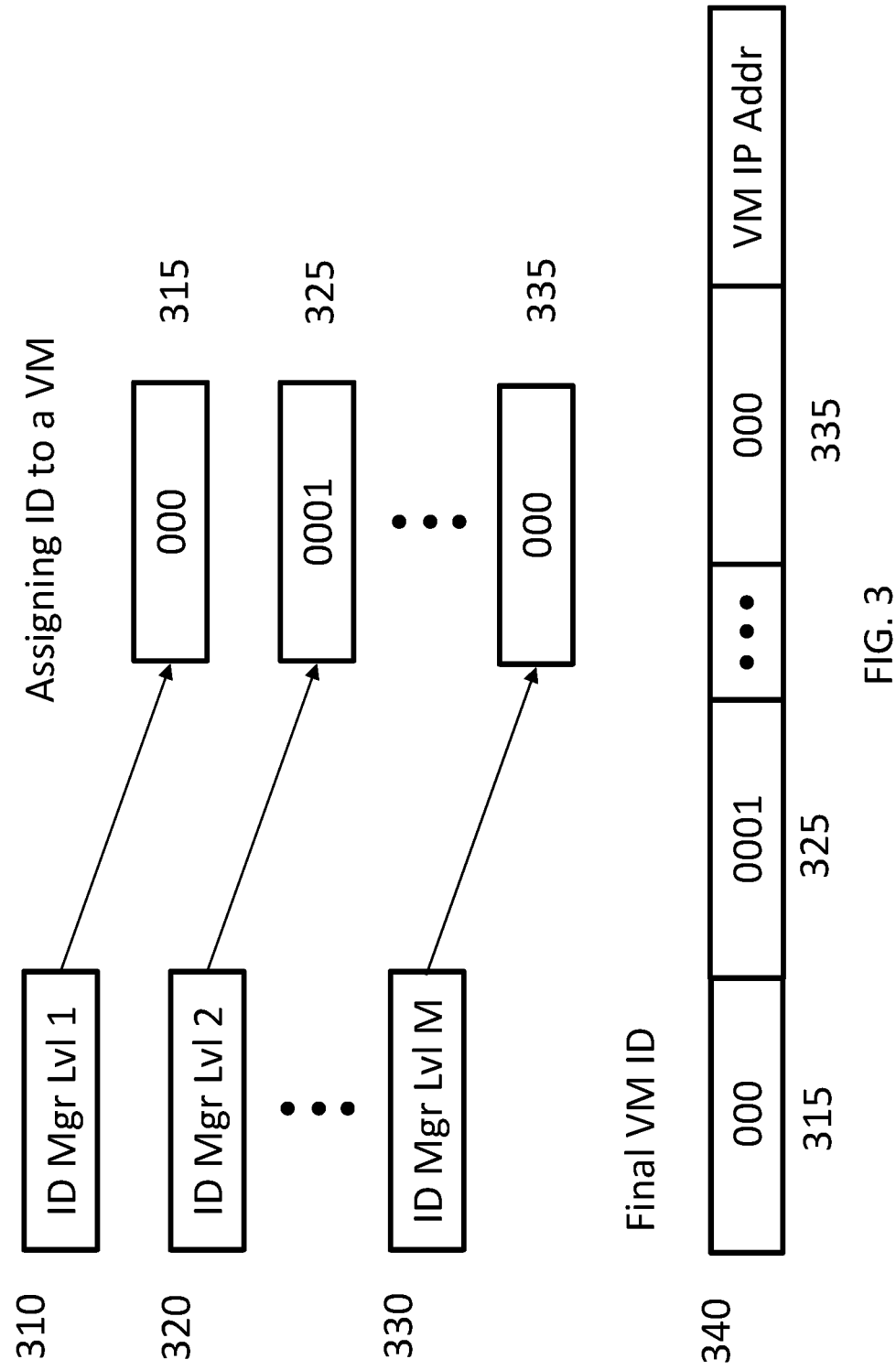
FIG. 3 is a block diagram of an exemplary VM ID, according to some embodiments of the present disclosure.

FIG. 3 is a block diagram of a final VM ID 340 in a networked system, according to some embodiments of the present disclosure. VM ID 340 can comprise one or more component level ID strings 315, 325, 335. Each component level ID string 315, 325, 335 can be assigned by a corresponding ID manager 310, 320, and 330, respectively, at an equivalent component level. Each VM can learn each component level ID string from one particular ID manager corresponding to that network level, in some embodiments. According to some embodiments, more than one ID manager may exist at each component level. When a new VM is created, it may send a broadcast message. This message may be broadcast on multiple channels, each corresponding to a component level of the system. ID managers residing on each component level may listen for broadcast messages and assign appropriate component level IDs, for example, based on the ID string associated with each particular component level ID manager. The lowest level ID manager, in this case the ID manager level M, may also assign a unique ID associated only with the particular VM. The final VM ID can be constructed by combining component level ID strings 315, 325, 335 with the VM IP address. In an alternative embodiment, the final VM ID can be constructed by combining component level ID strings 315, 325, and 335 but not including the VM IP address. In some embodiments, a VM ID without an IP address can be used to map to an associated IP address. A person having ordinary skill in the art would understand based on the present disclosure that IP addresses can be appended in applications when the IP address is expected to remain relatively static. Each ID manager level may correspond with a particular level of the networked system, such as network, data center, and server levels. Accordingly, each data center may be assigned a unique data center level ID string. Similarly, each server may be assigned a unique server level ID string. Each level may contain one or more ID managers to assist with VM ID assignment. Alternatively, each level may be defined based on another physical or non-physical characteristic of the networked system. According to an additional or alternative embodiment, a centralized ID manager may assign part of or the entire VM ID including some or each component level ID string.

In some embodiments, ID managers at each level of the networked system may assign component level ID strings based on proximity. In some embodiments, proximity information can be provided by a network operator to each ID manager. In some embodiments, proximity information can be measured automatically by polling characteristics such as latency between VMs at that particular level in that particular grouping and VMs at that particular level in other groupings. For example, the ID manger level M for server 202-1 can determine proximity to servers 202-N in the same data center 201 by sampling characteristics such as latency between VMs in server 202-1 and server 202-N. In some embodiments, this process can be coordinated instead by the ID manager at a level above, for example, by the ID manager level 2 for data center 201. Proximity information can then be disseminated to each ID manager at the level below (e.g., to those associated with server 202-1 and server 202-N). In some embodiments the process can be coordinated solely by a single ID manager at a higher level without the need for ID managers at each individual level. In some embodiments, when ID managers coordinate not only assignment of VM IDs, but also the determination of proximity, the process can be automated. Proximity may be determined based on a number of factors such as, but not limited to physical proximity (e.g., colocation in the same data country, data center, server, etc.), bandwidth, latency, jitter rate, or any other factor affecting or approximating the speed or efficiency of communication between VMs. Proximity can be determined at varying levels of granularity depending on the demands of the networked system. For example, some networked systems may require granularity only at the data center level, whereas others may need more granularity down to the server or chip level.

When two VMs are physically close to each other, the "distance" between the two respective VM IDs is generally set to be small. For example, when two VMs are on the same server or in the same data center, their VM IDs will be closer together in distance. Conversely, when two VMs are on different servers or in different data centers, their VM IDs will be further apart. The distance between two VM IDs may also be set based on other or additional criteria besides physical proximity, such as the other or additional criteria described throughout the present disclosure. Therefore, when steering traffic within the network, the distance between two VM IDs can be used to determine which VMs should be used for fulfilling a request to better account for timing and network demands.

In an example embodiment, the distance between VM IDs may be encoded using a Hamming distance. The Hamming distance between two strings of equal length is defined as the number of positions at which the corresponding symbols are different. The Hamming distance between two strings corresponds to the minimum number of substitutions required to change one string into the other. Thus, a larger Hamming distance can be used to encode two VMs that are further away. Strings of longer length can accommodate more distance granularity, and can therefore be used to encode more complex networked systems with multiple elements having varying distances from one another. Although the present description of FIG. 3 discusses VMs, a person of ordinary skill in the art would understand based on the present disclosure that a similar system can be implemented with microservices having respective microservice IDs, other cloud-native architectures, or other types of computing nodes.

Figure 4:
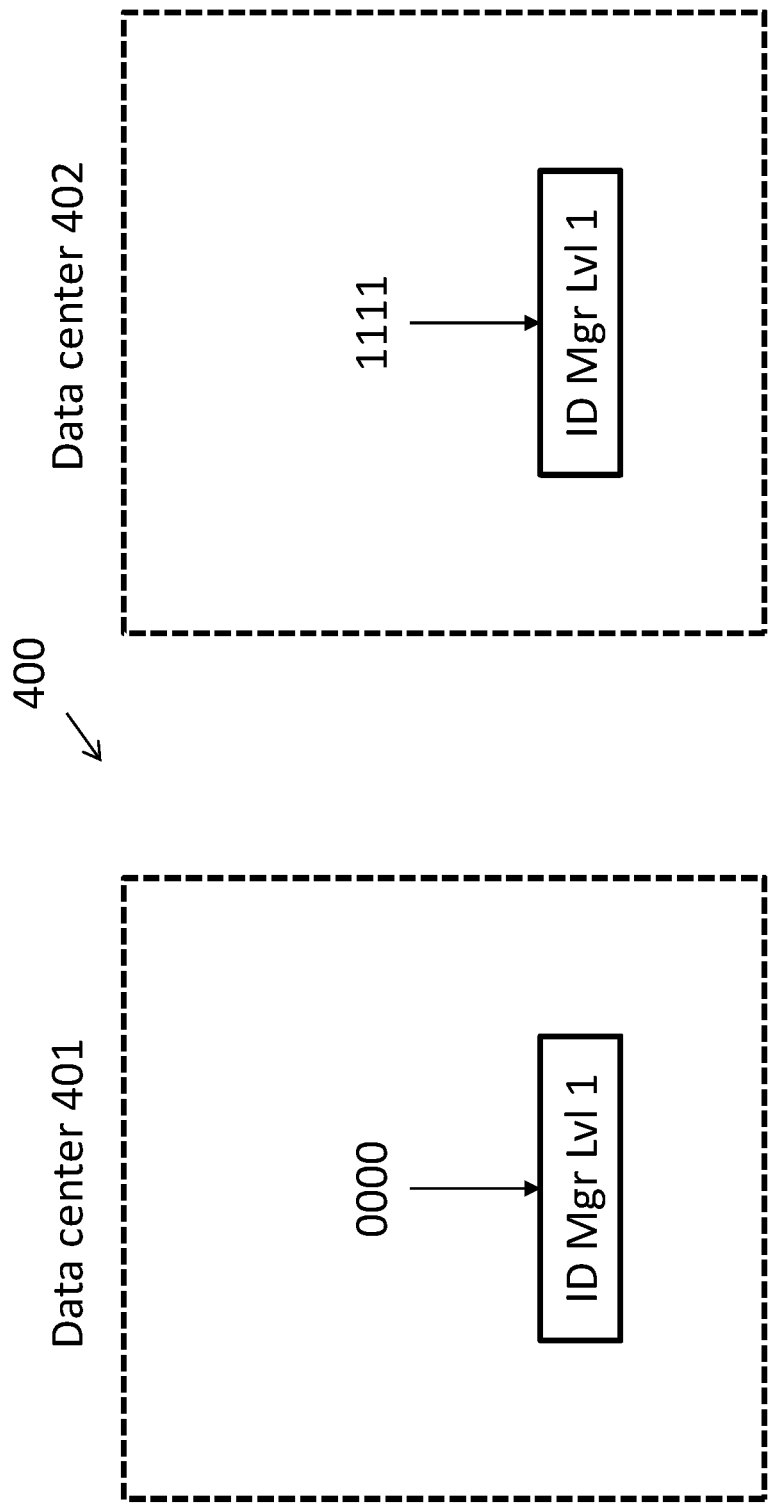
FIG. 4 is a block diagram of an exemplary pair of data centers with data center level ID managers, according to some embodiments of the present disclosure.

FIG. 4 is a block diagram of two data centers in a networked system 400, according to some embodiments of the present disclosure. In an example embodiment, ID manager level 1 corresponds to the data center level, and can be configured to assign 4-bit VM IDs. Each VM in data centers 401 and 402 can be assigned a level 1 ID string based on the proximity between data centers 401 and 402, respectively. Since only two data centers exist in FIG. 4, level 1 ID strings can be assigned to maximize the distance between VM IDs in each of the two data centers. For example, data centers 401 and 402 can be assigned level 1 ID strings of "0000" and "1111," respectively. The Hamming distance associated with these strings is 4, which is the maximum Hamming distance for a 4-bit string. Therefore, VMs in data center 401 will have VM IDs that are closer together than VM IDs associated with VMs in data center 402. By assigning VM IDs in this manner, networked system 400 can ensure that VMs in one data center will not request VMs in another data center if closer VMs are available, or that they will assign less traffic to VMs in another such data center. It should be appreciated based on the present disclosure that for more complicated networks, more ID manager levels can be used, and that each level ID string can comprise more or fewer bits.

According to some embodiments, each ID manager may learn of its appropriate ID string by a central ID manager, the highest ID manager, or the ID manager sitting one level up. According to an example with a central (or the highest) ID manager coordinating the process, the central ID manager may maintain a database of each respective ID manager at each component level. The central ID manager may monitor or learn of a distance between each ID manager. In some embodiments, each ID manager at a given level may report a measured distance information between itself and all the other ID managers at the same level to an ID manager sitting at the next level up. In either case, the ID managers can assign appropriate IDs to the ID managers below based on this measured distance information. Distance monitoring, for example, can be based on physical characteristics (i.e., different data centers, different server blades, etc.), or may be based on a measurement of delay/latency between VMs associated with each ID manager. Other indicia of distance are contemplated. The central ID manager may use this distance information to compute ID strings for each ID manager and publish these ID strings to each respective ID manager. As discussed throughout the present disclosure, each ID manager may then assign these respective ID strings to each VM. According to an additional or alternative embodiment, an ID manager from one or each level up may coordinate the process of assigning appropriate ID strings. Each ID manager may measure or learn of a distance to each other ID manager at that level. This may be accomplished by measuring or learning of delay or latency between each ID manager. This may then be reported to the ID manager at the next level up for assignment of ID strings. For example, each ID manager associated with each server in a data center may communicate to a data center ID manager the distance to other servers within the data center. The data center ID manager may then assign appropriate server-level ID strings to each ID manager. According to some embodiments, some or all IDs can be assigned manually by a network operator. For example, top level IDs can be assigned by a network operator, while lower level IDs can be assigned automatically by lower level ID managers.

According to some embodiments, management of requests can be performed in a distributed fashion. For example, when a VM needs to request service from another VM (e.g., to process a message), the requesting VM can look at the VM IDs of all available VMs and determine which ones are the closest to itself. When Hamming distance is used to codify proximity, the requesting VM may identify the proximity of available VMs based on the Hamming distance between its own VM ID and the VM IDs of available VMs. The requesting VM may then allocate the request based at least in part on the proximity of available VMs as determined by the Hamming distance without receiving information about distance to available VMs beyond the VM IDs of each respective available VM. For example, the requesting VM may load balance requests to different VMs when a Hamming distance is below a specified selection threshold. Alternatively, the requesting VM may request the closest available VM, or may select from one or more VMs with a distance below a specified threshold in combination with other known or polled criteria. For example, in some embodiments the requesting VM can identify a subset of peer VM's with distance below a threshold, and then round robin the requests between them for load balancing purpose. In an additional example, the VM can further take into account loading information associated with selected destination VM(s)s (for example, through other measurements and/or communications) and make a decision to which VM(s) to send a request based on both the distance and the loading of the destination nodes. According to some embodiments, the requests could be handled by a central manager. The central manager may route requests based on VM IDs that are based on Hamming distances. The central manager may keep a list of the VM IDs of available VMs and use both the VM ID of the requesting VM and the VM IDs of available VMs to assign a VM or VMs to handle the request. In some embodiments VM IDs can be associated with particular services. If a VM provides multiple types of services, and advertises these services separately, then it can be assigned an ID for each type of service it provides.

A person having ordinary skill in the art would understand that the VM IDs discussed throughout the present disclosure can be useful for allocating resources for a variety of types of requests, in some embodiments. For example, in an exemplary embodiment, a backup may be required for a failed VM. In this case, an available VM within the networked system would need to be identified. Using the VM IDs and associated methods described herein to locate an available VM for use as a backup of the failed VM can efficiently identify an available VM meeting the requirements for the request and reduce the time and resources needed to accomplish such a backup. Furthermore, in some embodiments if a VM is overloaded, its VM ID can be manipulated artificially to take it out of rotation. For example, the VM ID can be artificially adjusted to make it seem to other VMs that it is further away than it actually is. In another example, the abovementioned VM IDs can be used in a value-added service (VAS). In such an example, when a user downloads images from an internet server, one type of VAS service (embodied as a VM) can be tasked with compressing the images before sending the images out to the end user, thereby saving radio access network bandwidth. Other types of VAS include, but are not limited to, video compression and transcoding, rate limiting, TCP optimization, etc. The appropriate VM for performing such functions could be selected based on associated VM IDs of available VMs that perform these functions. Although the present description of FIG. 4 discusses VMs, a person of ordinary skill in the art would understand based on the present disclosure that a similar system can be implemented with microservices having respective microservice IDs, other cloud-native architectures, or other types of computing nodes.

FIG. 5 is a table listing available VMs that can be requested by a requesting VM, according to some embodiments of the present disclosure. The table can include other VMs a requesting VM can select 502, a distance associated with another VM 504, and a field indicating whether the distance associated with another VM is below a threshold 506. Some or all of the information in the table in FIG. 5 can be received, generated, and/or stored by a requesting VM when selecting another VM to request a service from.

According to an example embodiment, if the requesting VM needs to send requests to other VMs 502 for processing, it can determine a distance 504 based on the VM IDs of the available VMs. In an exemplary embodiment, the distance may be calculated based on a Hamming number, and calculated and/or stored as an integer or other type of value. In FIG. 5, the distance measurements 504 for VMs VM1 through VM5 are 1, 1, 2, 4, and 4, respectively.

In the example embodiment of FIG. 5, the requesting VM can select available VMs based on a selection threshold of 3. In the example of FIG. 5, VM 1, VM 2, and VM 3 pass the threshold as indicated by the "yes" value associated with those VMs 506, and may be included in a subsequent request. In the example of FIG. 5, VM4 and VM5 do not pass the threshold as indicated by the "no" value associated with those VMs 506, and are therefore not included. In some embodiments, the "yes" or "no" values can also be represented as 0s or 1s or can be represented by some other numeric value indicating whether the VM is below a threshold. In some embodiments, information about VMs not passing the threshold is deleted. Additional techniques for calculating and keeping track of VMs passing the threshold are contemplated. After the VM identifies all available VMs passing the threshold, the requesting VM can determine how to allocate requests. For example, the requesting VM may round robin requests to VM 1 to VM 3. Alternatively, the requesting VM can proportionally allocate the requests to VM 1 to VM 3 by allocating, for example, 40% of the requests to VM 1, 40% to VM 2, and 20% to VM 3 based on a predefined formula. It should be appreciated based on the present disclosure that different criteria including but not limited to Hamming distance can be used to select an appropriate threshold and to determine load balancing. Furthermore, selection thresholds may be set or configured to be variable so as to optimize the performance of the network. Although the present description of FIG. 5 discusses VMs, a person of ordinary skill in the art would understand based on the present disclosure that a similar system can be implemented with microservices having respective microservice IDs, other cloud-native architectures, or other types of computing nodes.

Figure 6:
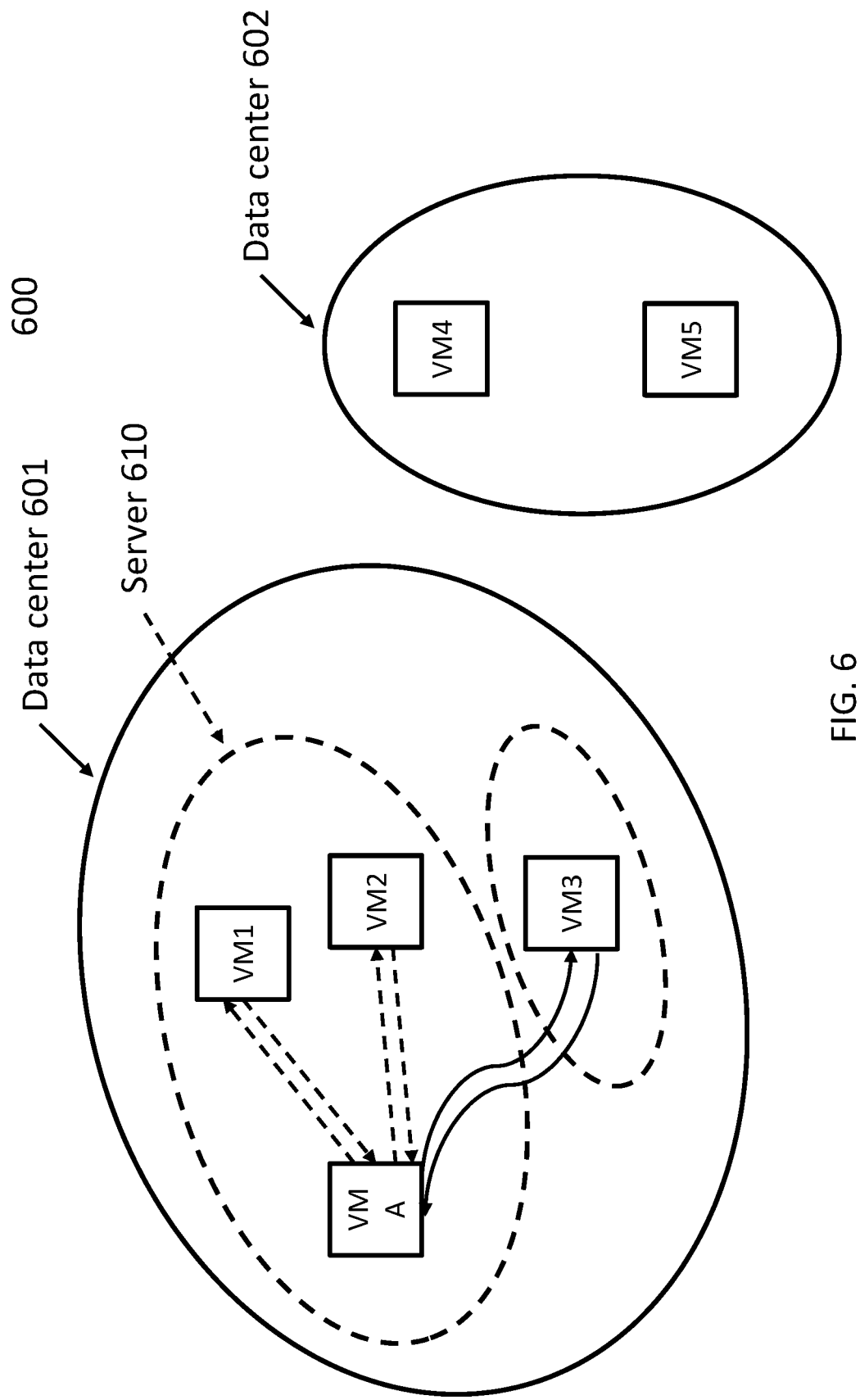
FIG. 6 is a block diagram of an exemplary networked system, according to some embodiments of the present disclosure.

FIG. 6 is a block diagram of the networked system 600 associated with the table of FIG. 5, according to some embodiments of the present disclosure. VM A is the requesting VM that can request from available VMs VM 1 to VM 5. According to an embodiment, VM A is located in the same server 610 as VM 1 and VM 2. VM 3, VM 4, and VM 5 are located in different servers (each server denoted by a dashed line). VM A, VM 1, VM 2, and VM 3 are all located within the same data center 601 whereas VM 4 and VM5 are all located in data center 602 (each data center denoted by solid lines).

Since VM A is in the same server 610 as VM 1 and VM 2, VM A is closest to VM 1 and VM 2. Therefore, the Hamming distance between the VM ID associated with VM A and the VM IDs associated with VM 1 and VM 2 is set to 1. Since VM A is in the same data center 601 as VM 3, but not within the same server 610, the Hamming distance between the VM ID associated VM A and the VM ID associated with VM 3 is larger. Therefore, the distance is set to 2. Since VM A is not within the same data center as VM 4 and VM 5, which are both in data center 602, the Hamming distance is larger. Therefore, the Hamming distances to the VM IDs associated with VM 4 and VM 5 are each set to 4. Accordingly, VM A may effectively request services from VM 1 to VM 5 by taking into account the Hamming distance as encoded by each VM's respective VM ID. Although the present description of FIG. 6 discusses VMs, a person of ordinary skill in the art would understand based on the present disclosure that a similar system can be implemented with microservices having respective microservice IDs, other cloud-native architectures, or other types of computing nodes.

It should be appreciated based on the present disclosure that the subject matter described herein can vary based on different network requirements. Different embodiments may be combined in part or as a whole in order to accomplish the needs of a particular network. The number of network components and the granularity of component level IDs may be increased or decreased to better serve the needs of a particular network.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
   receiving, by a first computing node, a first location-encoded computing node identifier (ID) that encodes a network location of the first computing node relative to one or more network levels within a networked system;
   receiving, by the first computing node, a plurality of location-encoded computing node IDs for a plurality of computing nodes within the networked system;
   generating, by the first computing node, a plurality of proximity values for the plurality of computing nodes based on comparing the first location-encoded computing node ID with the plurality of location-encoded computing node IDs associated with the plurality of computing nodes;
   determining, by the first computing node, to send a processing request to a second computing node from the plurality of computing nodes based on a proximity value between the first computing node and the second computing node; and sending the processing request from the first computing node to the second computing node based on the determination.

2. The method of claim 1, wherein determining to send the processing request to the second computing node comprises determining that the proximity value satisfies a network distance threshold.

3. The method of claim 2, wherein:
determining to send the processing request to the second computing node comprises identifying additional computing nodes from the plurality of computing nodes that are within the network distance threshold; and
sending the processing request from the first computing node to the second computing node based on the determination comprises sending portions of the processing request to the additional computing nodes.

4. The method of claim 1, wherein generating the plurality of proximity values for the plurality of computing nodes comprises decoding Hamming distances between the first location-encoded computing node ID to the plurality of location-encoded computing nodes IDs.

5. The method of claim 1, wherein generating the plurality of proximity values for the plurality of computing nodes comprises separately comparing network level segments of the location-encoded computing node IDs of the plurality of computing nodes.

6. The method of claim 1, wherein sending the processing request is also based on loading information associated with the second computing node.

7. The method of claim 1, further comprising sending a broadcast message on a plurality of different channels corresponding to a plurality of network levels of the networked system; and
wherein:
ID managers residing on the plurality of network levels assign a plurality of network level IDs in response to the broadcast message; and
the first computing node ID comprises the plurality of network level IDs.

8. The method of claim 1, further comprising:
identifying a subset of a plurality of peer computing nodes with a proximity value below a network distance threshold; and
sending a plurality of processing requests to the subset of the plurality of peer computing nodes in accordance with a round robin sequence.

9. The method of claim 1, wherein the first computing node and the plurality of computing nodes comprise microservices.

10. A method comprising:
receiving, at a first computing node identifier (ID) manager of a networked system, a first-level computing node ID segment corresponding to a first plurality of computing nodes managed by the first computing node ID manager, wherein the first-level computing node ID segment encodes a network proximity between the first plurality of computing nodes and a second plurality of computing nodes managed by a second computing node ID manager;
receiving, at the first computing node ID manager, proximity values for pairs of computing nodes of the first plurality of computing nodes;
generating, by the first computing node ID manager, a second-level computing node ID segments for each of the first plurality of computing nodes based on the received proximity values, wherein the second-level computing node segments encodes the network proximity between computing nodes with the first plurality of computing nodes;
generating, by the first computing node ID manager, a two-level computing node ID for each of the first plurality of computing nodes by combining the first-level computing node ID segment with the second-level computing node ID segment associated for each of the first plurality of computing nodes; and
providing the two-level computing node ID to each of the first plurality of computing nodes.

11. The method of claim 10, further comprising appending, by the first computing node ID manager, an IP address of an computing node from the first plurality of computing nodes to a two-level computing node ID before providing the two-level computing node ID.

12. The method of claim 10, further comprising:
receiving, by a first computing node of the first plurality of computing nodes and from the first computing node ID manager, a two-level computing node ID associated with the first computing node;
receiving, by the first computing node, computing node IDs of a third plurality of computing nodes, wherein one or more of the computing node IDs of the third plurality of computing nodes comprise two-level computing node IDs;
determining, by the first computing node, a plurality of proximity values for the third plurality of computing nodes based on comparing the two-level computing node ID of the first computing node with the computing node IDs of the third plurality of computing nodes;
identifying, by the first computing node, a second computing node from the third plurality of computing nodes based on a network proximity value determined between the first computing node and the second computing node; and
sending a processing request from the first computing node to the second computing node.

13. A system comprising:
a first computing node associated with a first location-encoded computing node identifier (ID) that encodes a network location of the first computing node relative to one or more network levels within a networked system, the first computing node comprising:
a processor, and
a computer readable storage medium having instructions thereon configured to cause the processor of the first computing node to:
receive a plurality of location-encoded computing node IDs for a plurality of computing nodes within the networked system;
generate a plurality of proximity values for the plurality of computing nodes based on comparing the first location-encoded computing node ID with the plurality of location-encoded computing node IDs associated with the plurality of computing nodes;
determine to send a processing request to a second computing node from the plurality of computing nodes based on a proximity value between the first computing node and the second computing node; and
send the processing request from the first computing node to the second computing node based on the determination.

14. The system of claim 13, wherein determining to send the processing request to the second computing node comprises determining that the proximity values satisfies a network distance threshold.

15. The system of claim 14, wherein:
determining to send the processing request to the second computing node comprises identifying additional computing nodes from the plurality of computing nodes that are within the network distance threshold; and
sending the processing request from the first computing node to the second computing node based on the determination comprises sending portions of the processing request to the additional computing nodes.

16. The system of claim 13, wherein generating the plurality of proximity values for the plurality of computing nodes comprises decoding Hamming distances between the first location-encoded computing node ID to the plurality of location-encoded computing nodes IDs.

17. The system of claim 13, wherein generating the plurality of proximity values for the plurality of computing nodes comprises separately comparing network level segments of the location-encoded computing node IDs of the plurality of computing nodes.

18. The system of claim 13, wherein sending the processing request is also based on loading information associated with the second computing node.

19. The system of claim 13, wherein the computer readable storage medium further comprises additional instructions that are executable by the processor to send a broadcast message on a plurality of different channels corresponding to a plurality of network levels of the networked system; and wherein:
ID managers residing on the plurality of network levels assign a plurality of network level IDs in response to the broadcast message; and
the first computing node ID comprises the plurality of network level IDs.

20. The system of claim 13, wherein the computer-readable storage medium further comprises additional instructions that are executable by the processor to:
identify a subset of a plurality of peer computing nodes with a proximity value below a network distance threshold; and
send a plurality of processing requests to the subset of the plurality of peer computing nodes in accordance with a round-robin sequence.

* * * * *